Jan. 28, 1964 R. P. SHEVCHENKO 3,119,623
THIN LAND SEAL UNIT WITH SEAL TYPE PRESSURE REGULATOR
Filed March 22, 1962
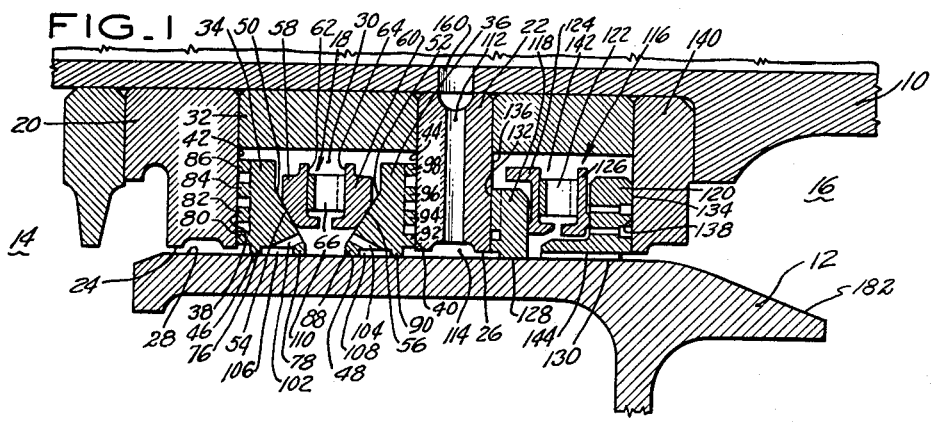
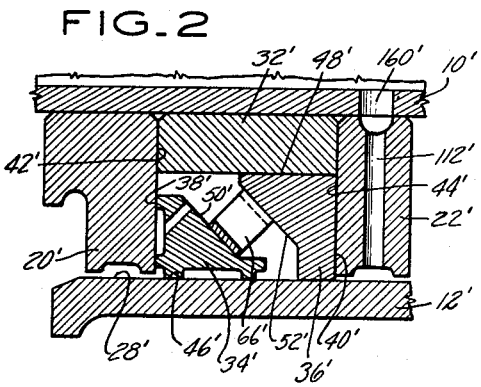
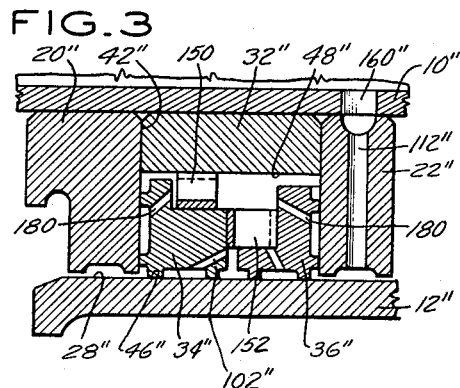
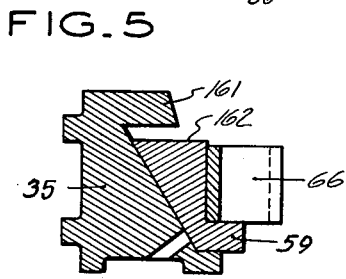
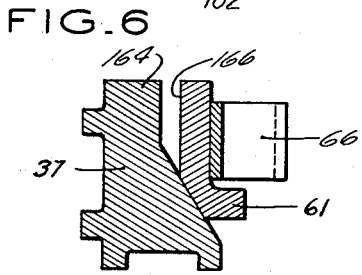
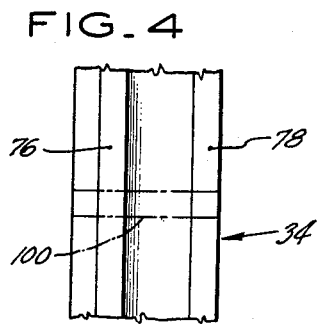
INVENTOR
RICHARD P. SHEVCHENKO
BY *Vernon F. Hauschild*
ATTORNEY

United States Patent Office 3,119,623
Patented Jan. 28, 1964

3,119,623
THIN LAND SEAL UNIT WITH SEAL TYPE PRESSURE REGULATOR
Richard P. Shevchenko, Marlborough, Conn., assignor to United Aircraft Corporation, East Hartford, Conn., a corporation of Delaware
Filed Mar. 22, 1962, Ser. No. 181,723
10 Claims. (Cl. 277—3)

This is a continuation-in-part of U.S. application Serial No. 647,892 filed March 22, 1957, on a Seal Unit by Richard P. Shevchenko, now abandoned, and the invention relates to seals and more particularly to seals of the split ring carbon type.

It is an object of this invention to provide a carbon type split seal which is urged against one or more sealing surfaces and to teach the method for doing same.

It is a further object of this invention to provide a single means adapted to cause a split carbon type seal to be urged against more than one sealing surface at the same time.

It is a further object of this invention to teach the use of thin, spaced, substantially parallel, circumferential lands as the sole sealing surface for split carbon type ring seals.

It is still a further object of this invention to teach the use of a second seal in combination with a first seal which second seal is used as a pressure regulator and pressure relief valve with respect to said first seal.

It is still a further object of this invention to provide a high pressure source on the anti-sealing side of a seal unit to force back the material being excluded by the seal unit should the seal lift from its sealing surface.

Other objects and advantages will become apparent to those skilled in the art when the complete description of my invention contained hereinafter is considered in conjunction with the associated drawings in which:

FIG. 1 is a cross-sectional view of the split carbon type seal ring unit taught by my invention and shown in a practical embodiment between a rotatable shaft and a stationary sleeve and utilizing a high pressure source to prevent leakage past the seal when the seal lifts off its cooperating sealing surface together with a second seal used to preserve said high pressure source and to serve as a relief valve to limit the pressure in said high pressure source to a preselected value.

FIG. 2 is a cross-sectional view of a split carbon type seal relative to my invention showing a double seal ring unit and utilizing a single means to urge both seals against two sealing surfaces simultaneously, for example, both against an axially and a radially extending sealing surface.

FIG. 3 is a showing comparable to FIG. 2 but utilizing more than one seal urging means.

FIG. 4 is a partial developed view of an axially extending sealing surface of a split carbon type ring seal utilizing thin, spaced, substantially parallel, circumferentially extending lands as the sole sealing surface and further showing an axially extending flange in phantom for the purpose of describing the hazards associated with an axially extending sealing surface.

FIG. 5 is a cross sectional showing of a split carbon type ring seal showing means to limit the radial movement of the seal.

FIG. 6 is comparable to FIG. 5 and shows a second diametrical seal movement limiting means.

Referring to FIG. 1 we see rotatable shaft 10 and stationary cylindrical sleeve 12. Shaft 10 and sleeve 12 may be a part of any powerplant or engineering installation in which it is an object to keep the atmosphere in area 14 from entering area 16 and vice versa. This may be necessary since the atmosphere in area 14 could be permeated with lubricating oil particles which carry disagreeable odors and therefore would not be acceptable in area 16 from which air is taken to perform a control function and the control parts would be adversely affected sensitivitywise by the deposit of oil particles thereon or air from area 16 may eventually be used for passenger cabin pressurization in modern aircraft jet engines.

Seal unit 18 is provided to act between rotating shaft 10 and stationary sleeve 12 to prevent the fluid in chamber 14 from getting to chamber 16 and vice versa. To assist in this function, rotatable shaft 10 carries radially extending flanges 20 and 22 thereon, which flanges are axially spaced on shaft 10. The outer periphery anti-shaft ends or circumferential edges 24 and 26 of flanges 20 and 22 respectively are in close proximity to axially extending cylindrical surface 28 of stationary sleeve 12 such that sleeve 12, shaft 10 and flanges 20 and 22 form a substantially closed annulus 30 when spacer ring 32 is in place. Sealing unit 18 comprises two carbon type seal rings 34 and 36 which are both split in known fashion either as one piece split piston rings or as a plurality of circumferential segments which, when placed in mating relation, form a complete carbon seal ring. Seal rings 34 and 36 have radially extending surfaces 38 and 40 which bear against the radially extending surfaces 42 and 44 of flanges 20 and 22 and also have axially extending surfaces 46 and 48 which bear against axially extending surface 28 of sleeve 12. Sealing rings 34 and 36 further have angular surfaces 50 and 52 respectively which lie at opposed angles, as shown in FIG. 1. By opposed angles I means that surfaces 50 and 52, as shown in FIG. 1, form equal angles with any radial line drawn between them. Further, the angular surfaces may be said to lie in a plane which completes a triangle with the seal axially and radially extending surfaces when viewed in cross-section. The function of angular surfaces 50 and 52 is to cooperate with corresponding angular surfaces 54 and 56 of stiffener rings 58 and 60 respectively. The stiffener rings 58 and 60 are rings of metal which serve to support split carbon ring seals 34 and 36 and cause said ring seals to present continuous, non-wavy sealing surfaces. Stiffener rings 58 and 60 have radially extending surfaces 62 and 64 which are urged apart axially by spring means 66. Spring means 66 may be any type of spring. Whether spring 66 is in the form of a wave washer or a series of circumferentially spaced coil springs is immaterial so long as the force necessary to urge stiffener rings 58 and 60 apart axially is present. By urging or forcing stiffeners 58 and 60 apart axially, spring means 66, in combination with the stiffener rings, and because of the reaction between the angular surfaces 54 and 56 of the stiffener rings coacting with the angular surfaces 50 and 52 of the seal rings, cause seal rings 34 and 36 to be urged in both an axial and radial direction simultaneously. This causes radially extending surfaces 38 and 40 of seal rings 34 and 36 to bear against radially extending surfaces 42 and 44 of flanges 20 and 22 and further causes axially extending surfaces 46 and 48 of seal rings 34 and 36 to bear against axially extending surface 28 of sleeve 12.

While FIG. 1 shows a seal unit 18 comprising two ring seals 34 and 36 and in this arrangement the opposed angular surfaces are desirable, it should be borne in mind that one of said surfaces need not be angular but could be radially extending in seal units where only one seal ring is effective or desired and it has an angular surface 50 cooperating with angular surface 54 of stiffener ring 58. For example, seal ring 34, stiffener ring 58 and spring 66 may be used in combination with stiffener 126 and seal ring 120, with comparable results as regards two directional urging on seal ring 34. Further, if seal ring 34 was to be used as the sole sealing means, spring 66 will bear against surface 44 of flange 22 to so urge seal ring 34, with the assistance of stiffener ring 58.

It is to be noted that the sole axial sealing or bearing surface presented by seal rings 34 and 36 comprise thin, spaced, substantially parallel, circumferentially extending lands, such as 76 and 78 of axially extending surface 46 of seal ring 34. These circumferential axially extending lands are also shown at 88 and 90 on axially extending surface 48 of seal ring 36. While FIG. 1 shows two axially extending lands along the axially extending surfaces, such is done to give greater bearing on sealing surface and therefore greater seal life and to prevent seal cocking. The advantage to be gained by using these thin, spaced, circumferential lands as the sole axially extending sealing surface is to prevent a hydrodynamic film of oil or other fluid from building up between the land and its cooperating sealing surface such as 28 and become sufficiently strong to lift the seal ring, such as 34, away from the cooperating surface 28 thereby permitting leakage past the seal. Experience has shown, as best illustrated in FIG. 4, that if an axially extending surface or land, as shown in phantom as 100, exists along face 46 of seal ring 34, a hydrodynamic film of oil will be formed along land 100 to lift seal 34 off of its cooperating mating surface, such as 28, and permit the pumping of oil or the like past seal 34.

Experience has further shown that the aforementioned hydrodynamic oil film occurs only along axially extending sealing surfaces between a rotating shaft 10 or its surrounding sleeve 12 and the seal 34 which rotates relative thereto. This hydrodynamic oil film does not occur along radially extending sealing surfaces such as surfaces 80 through 86 nor does it occur when the shaft is reciprocating as opposed to rotating.

It is an important teaching of this application when sealing between an oil permeated chamber and a second pressurized chamber to provide a seal ring having at least one continuous, circumferential land with a preselected axial dimension as the sole sealing contact between the seal ring and the axially extending sealing surface such as sleeve 28 or shaft 10. The thickness or axial dimension of the axially extending land such as 76 and 78 is preselected such that under the operating conditions encountered, it is of insufficient thickness to sustain an oil film. Just what this thickness will be depends upon the land unit load, the relative speed between the land and the contact surface such as 28 or 10 and the lubricant viscosity. For example, when MIL-L-7808 oil is used as the lubricant and graphite carbon is used to make the seal ring rubbing against a chrome plate liner such as 28, for shaft speeds up to 4000 r.p.m. and with a pressure drop of 9 p.s.i. across the seal, it has been found that best seal performance can be obtained when the axially extending rubbing or sealing surface of lands 76-78 is about 0.040″. This thickness will vary as the aforementioned operating conditions vary. It should be borne in mind that the main teaching is to select a thickness which is insufficient to sustain an oil film under the particular seal operating conditions.

Holes 102 and 104 are placed in seals 34 and 36 respectively to bring annular chambers 106 and 108 between the circumferential lands 76 and 78 or 88 and 90, respectively, into communication with the interior cavity 110 of seal unit 18 for the purpose of pressure balance. It will be apparent, as shown in FIG. 3, that pressure relief slots can be used in conjunction with any and all sealing lands, whether on the radial or axial surfaces.

The purpose of holes 102 and 104 (FIG. 1) is to equalize the pressure in cavities 106, 108, and 110 such that the seals are counterbalanced so that an excessive force does not exist to cause the seal rings 34 and 36 to wear at a fast rate due to high pressure loading.

By any convenient means such as through hole 112 in flange 22 and hole 160 in shaft 10 a high pressure source of air or the like may be passed into annular chamber 114 which lies on the non-sealing side of seal unit 18. For example, air from the compressor of the powerplant may be used for this purpose. The function to be performed by the high pressure source within annular chamber 114 is to serve to blow the fluid from chamber 14, possibly oil back toward chamber 14, should seals 34 and 36 lift and leakage commence in a direction away from chamber 14. The high pressure source or reverse pressure source in chamber 114 is higher than the pressure source in chamber 14 such that with ring seals 34 and 36 unseated, the direction of flow would be from chamber 114 to chamber 14. It will be obvious that if the pressure source within chamber 114 becomes excessively high, it will cause excessive seal wear. The size of holes 160 is selected to be large enough to provide the necessary reverse pressure in chamber 114 yet small enough so that seal unit 116 can act effectively as a relief valve.

To prevent the high pressure source within chamber 114 from exceeding a preselected critical pressure, and also to preserve the pressure source within chamber 114 such that it does not dissipate or leak away, a second seal unit 116 is provided. Seal valve unit 116 comprises carbon type ring seals 118 and 120, which are forced apart axially by spring unit 122 using seal stiffener rings 124 and 126. Centrifugal force and the fact that the seal rings are made slightly oversized diametrically before the gaps are closed, causes axially extending surfaces 128 and 130 of seal rings 118 and 120, respectively, to bear against axial surface 28 of sleeve 12, while spring means 122 causes radially extending surfaces 132 and 134 of seal rings 118 and 120, respectively, to bear against radially extending surfaces 136 and 138 of flanges 22 and 140 respectively. Spring means 122 is so selected that the pressure source within chamber 114 is maintained substantially free of leakage when it is below a predetermined value and when the pressure source exceeds this preselected value, seal ring 118 is caused to back off of surface 136 thereby reducing the pressure within the chamber 114 by permitting it to bleed or leak away through chamber 142 and the axially extending grooves 144 within seal ring 120. In this fashion a seal of the carbon ring type is being used as a relief valve or pressure control limiter for maintaining and regulating a high pressure source on the anti-sealing side of a second seal.

The advantages to be gained by using a seal as a relief valve are: (1) The seal provides tremendous relief flow capacity compared to the usual relief valve. (2) The seal avoids the coking and sticking problems usually associated with ball and spring or sliding sleeve type of relief valves when used in a hot, oily atmosphere. (3) The use of the seal as a relief valve reduces the total number of parts needed to accomplish this function. Back-to-back seals are necessary if the reverse pressure source is to be used and, if our second seal did not serve as a relief valve, a separate relief valve would be needed to accomplish this function.

FIGS. 2 and 3 illustrate sealing configurations comparable to seal unit 18 in FIG. 1 but are included to illustrate a different type of spring means. In FIG. 2 spring means 66′ bears against angular surfaces 50′ and 52′ of ring seals 34′ and 36′, respectively, to cause simultaneously, radially extending surfaces 38′ and 40′ to bear against radially extending surfaces 42′ and 44′ of flanges 20′ and 22′ and to cause axially extending surface 46′ to bear against axially extending surface 28′ of sleeve 12′ while axially extending surface 48′ of seal 36′ is caused to bear against rotary shaft 10′ through spacer 32′. Seal ring 36′ may be one piece or split and serves the main function of rending support to spring means 66′ as it urges seal ring 34′.

FIG. 3 illustrates the use of two separate spring units 150 and 152 to act on carbon type seal ring 34″. Springs means 152 urges seal ring 34″ in an axial direction while spring means 150 urges seal ring 34″ in a radial direction. Spring means 152 also urges ring seal 36″ in an axial direction. Spring means 152 also urges ring seal 36″ in an axial direction while centrifugal force urges it in a radial direction.

For purposes of illustration, I use reference numerals in FIGS. 2 and 3 which correspond to the reference numerals used in FIG. 1 and provide a single prime mark with respect to FIG. 2 and a double prime mark with respect to FIG. 3.

FIGS. 5 and 6 illustrate means to limit the radial movement or diametrical expansion of the split carbon seal ring with respect to the stiffener. This is important in assembling the carbon ring within its cylindrical housing since the spring means would be urging the split seal ring to expand radially beyond the available radial space within its housing. In FIG. 5, spring means 66 is shown to be urging stiffener 59 and split carbon type seal ring 35 to move both to the left which is axial and toward the bottom of the sheet which is radial. Lip 161 is provided on seal 35 to bear against surface 162 of stiffener ring 59 thereby preventing further radial expansion of seal ring 35.

FIG. 6 illustrates another means of limiting radial movement of split ring seal 37 by spring means 66 and stiffener ring 61. In FIG. 6, lip 164 is provided to bear against surface 166 of stiffener ring 61 to limit the radial expansion or movement of seal ring 37.

Chamfered or beveled surface 182 is provided on sleeve 12 to assist in contracting diametrically expanded split seal rings in assembly.

As illustrated in FIGS. 1, 2 and 3, there are many variations of sealing lands and pressure relief slots, such as 102″ and 180, and the particular seal configuration selected for a given use must be fabricated dependent upon the operating conditions.

It is to be understood that the invention is not limited to the specific embodiment herein illustrated and described, but may be used in other ways without departure from its spirit as defined by the following claims.

I claim:

1. Relatively rotatable elements having radially spaced axially extending cylindrical surfaces positioned concentrically about an axis to define an annular passage, a first gas chamber of high pressurization on one side of said annular passage, second gas chamber of low pressurization on the other side of said annular passage, said first gas chamber being oil permeated, means sealing said annular passage to prevent flow between said chambers including a seal ring presenting at least one thin, continuous, circumferential land with an axially extending sealing surface as the sealing contact between said ring and one of said axially extending cylindrical surfaces, said axially extending sealing surface having an axial dimension sufficiently small to be incapable of sustaining an oil film between said land and said cylindrical surface which said land contacts, and a second land, said two lands constituting the sole sealing contacts between said ring and one of said axially extending cylindrical surfaces on said seal spaced axially from and substantially identical with said land.

2. Elements being relatively rotatable at up to 4000 r.p.m. and having radially spaced axially extending cylindrical surfaces positioned concentrically about an axis to define an annular passage, a first gas chamber of high pressurization on one side of said annular passage, second gas chamber of low pressurization on the other side of said annular passage, such that about a 9 p.s.i. pressure drop exists therebetween, said first gas chamber being oil permeated with oil equivalent to MIL 7808 oil, means sealing said annular passage to prevent flow between said chambers including a seal ring of graphite carbon presenting at least one thin, continuous, circumferential land with an axially extending sealing surface as the sole sealing contact between said ring and one of said axially extending cylindrical surfaces, said axially extending sealing surface having an axial dimension of about .040″.

3. A pressurized gas chamber, a fluid-permeated chamber pressurized to a greater extent than said gas chamber, relatively rotatable and concentric first and second members of circular cross section defining an annular passage between said chambers, axially spaced ring flanges carried by said first member and extending radially therefrom and terminating with slight radial clearances from said second member so that said members and said flanges roughly define an annular cavity, a seal unit including two axially spaced split carbon-type ring seals located in said cavity, means to urge said seals radially against said second member and axially against the axially adjacent surfaces of said ring flanges to seal across said clearances, each of said seals shaped to present two axially spaced, narrow, substantially parallel, circumferential, continuous lands as the sole sealing surfaces between said seals and said second member, and means to provide a continuous back pressure to the gas chamber side of said seal unit.

4. A pressurized gas chamber, a fluid-permeated chamber pressurized to a greater extent than said gas chamber, relatively rotatable and concentric first and second members of circular cross section defining an annular passage between said chambers, a first ring flange adjacent said fluid-permeated chamber, a second ring flange axially spaced from said first ring flange toward said gas chamber, said ring flanges carried by said first member and extending radially therefrom and terminating with slight radial clearances from said second member so that said members and said flanges roughly define an annular cavity, a seal unit including two axially spaced split carbon-type ring seals located in said cavity, means to urge said seals radially against said second member and axially against the axially adjacent surfaces of said first and second ring flanges to seal across said clearances, each of said seals shaped to present two axially spaced, narrow, substantially parallel, circumferential, continuous lands as the sole sealing surfaces between said seals and said second member, means to provide a continuous back pressure to the gas chamber side of said seal unit, and means including a carbon-type ring seal bearing against said second member and the side of said second ring adjacent said gas chamber to regulate said back pressure.

5. Apparatus according to claim 4 including means to pressure relieve the area between said lands.

6. Apparatus according to claim 5 including means to establish a limit of diametric expansion of said split seals.

7. A carbon-type ring seal unit comprising two carbon seal rings each having both an axially extending surface along their outer diameters and a radially extending surface and so shaped on said surfaces to present thin, substantially parallel, spaced, circumferential bearing lands solely and further having an angular surface which lies in a plane which completes a triangle with said radially and axially extending surfaces when viewed in cross-section, stiffener rings having angular surfaces corresponding to and mating with said seal ring angular surfaces and further having radially extending surfaces, means contacting said stiffener ring radially extending surfaces to urge said seal rings both radially and axially by distributing pressure thru said angular surfaces.

8. A split carbon-type ring seal having an axis and both an axially extending and a radially extending sealing surface, and further having a first surface extending in a direction to form a triangle with said sealing surfaces and still further having a second surface extending parallel to one of said sealing surfaces, a continuous rigid ring having a first surface extending parallel to said first surface of said seal, means urging said first surface of said rigid ring against said first surface of said seal thereby urging said seal in both an axial and a radial direction to urge said sealing surfaces into contact during operation, and said rigid ring further having a second surface extending parallel to said second surface of said seal and being spaced and positioned therefrom to contact therewith during operation to limit radial expansion of said seal.

9. A sealing arrangement comprising first and second relatively rotatable concentric members each having a cylindrical surface with said cylindrical surface positioned to define an annulus and further having first and second axially spaced ring flanges projecting from said first member toward said second member, a first pressurized chamber on the side of said annulus adjacent said first flange and a second pressurized chamber on the side of said annulus adjacent said second flange, first and second split carbon-type seal rings located in said annulus with said first ring presenting a sealing surface to said first flange which sealing surface faces said first chamber and with said second ring presenting a sealing surface to said second flange which sealing surface faces said first chamber, means to urge said first seal ring against said second member and said first flange and said second seal ring against said second member and said second flange to prevent flow from said first to said second chamber, means to provide a continuous reverse pressure into said annulus between said seals, which reverse pressure is greater than the pressures in said chambers such that said reverse pressure will tend to seat said first seal ring and to prevent leakage therethrough should said first seal ring become unseated and further such that said second seal ring will unseat to relieve said reverse pressure when the force imparted to said second seal ring by said reverse pressure exceeds the force imparted to said second seal ring by said urging means.

10. A pressurized gas chamber, a fluid-permeated chamber pressurized to a greater extent than said gas chamber, relatively rotatable and concentric first and second members of circular cross section defining an annular passage between said chambers, axially spaced ring flanges carried by said first member and extending radially therefrom and terminating with slight radial clearances from said second member so that said members and said flanges roughly define an annular cavity, a seal unit including two axially spaced split carbon-type ring seals located in said cavity, means to urge said seals radially against said second member and axially against the axially adjacent surfaces of said ring flanges to seal across said clearances, each of said seals shaped to present two axially spaced, narrow, substantially parallel, circumferential, continuous lands as the sole sealing surfaces between said seals and said second member.

References Cited in the file of this patent

UNITED STATES PATENTS

| | | |
|---|---|---|
| 1,165,486 | Allen | Dec. 28, 1915 |
| 2,707,118 | Swartz et al. | Apr. 26, 1955 |

UNITED STATES PATENT OFFICE
CERTIFICATE OF CORRECTION

Patent No. 3,119,623 January 28, 1964

Richard P. Shevchenko

It is hereby certified that error appears in the above numbered patent requiring correction and that the said Letters Patent should read as corrected below.

Column 5, line 58, after "land," insert -- on said seal spaced axially from and substantially identical with said land, --.

Signed and sealed this 23rd day of June 1964.

(SEAL)
Attest:

ERNEST W. SWIDER
Attesting Officer

EDWARD J. BRENNER
Commissioner of Patents